United States Patent [19]
Tardiff et al.

[11] Patent Number: 5,784,236
[45] Date of Patent: Jul. 21, 1998

[54] VARIABLE FREQUENCY DRIVE REFLECTED WAVE SUPPRESSORS

[75] Inventors: Dale Tardiff; James Funke, both of Calgary, Canada

[73] Assignee: Tycor International Corp., Canada

[21] Appl. No.: 861,712

[22] Filed: May 22, 1997

[51] Int. Cl.[6] ........................................ H02H 9/00
[52] U.S. Cl. ...................... 361/56; 361/58; 361/111; 361/118; 361/23
[58] Field of Search .................... 361/56, 58, 111, 361/118, 119, 127, 115, 31, 23, 24

[56] References Cited

U.S. PATENT DOCUMENTS

| | | |
|---|---|---|
| 5,444,609 | 8/1995 | Swamy et al. .................... 363/47 |
| 5,610,793 | 3/1997 | Luu ................................... 361/111 |
| 5,646,810 | 7/1997 | Funke ................................ 361/56 |

OTHER PUBLICATIONS

R. Kerman et al., "Interaction of Drive Modulation & Cable Parameters on AC Motor Transients", 1966, IEEE.
Swaney and Houdek, "Low Cost ASD Motor Protection Stops the Damage to Motors Due to ASD dv/dt Effects" Aug. 22, 1995.
Rockwell Automation, Allen–Bradley, "Effective Motor Protection Against Reflected Wave Phenomenon" May 1996.
Product Literature, TCI, Trans–Coil, Inc., Jun. 1996.

*Primary Examiner*—Jeffrey A. Gaffin
*Assistant Examiner*—Stephen Jackson
*Attorney, Agent, or Firm*—Dickstein Shapiro Morin & Oshinsky LLP

[57] ABSTRACT

The invention provides a circuit to protect an AC motor powered by a Variable Frequency Drive (VFD) from overvoltages caused by reflected waves. A full wave bridge rectifier circuit across the lines of the motor to be protected provides rectified voltage output to a capacitor, across which a low resistance discharge resistor in series with one or more zener diodes is attached. When an overvoltage above the clamping voltage of the zener diode(s) occurs across the protected lines, the zener diode(s) will conduct, causing the excess charge across the capacitor to discharge through the resistor until the voltage drops below the clamping voltage of the diode(s).

6 Claims, 5 Drawing Sheets

FIG.8

VARIABLE FREQUENCY DRIVE REFLECTED WAVE SUPPRESSORS

FIELD OF THE INVENTION

The present invention relates to the suppression of AC motor transient over-voltages (usually referred to as reflected waves) which result from drive-motor-cable dynamic responses to inverter pulse voltages from a variable frequency drive.

BACKGROUND OF THE INVENTION

Many AC motors are powered by Variable Frequency Drives (VFDs) which save power and provide a range of motor speeds. These motor drives have also been known as Adjustable Speed Drives (ASD). VFDs have been continuously improved since their introduction in the 1960's. The major area of improvement is in the switching speeds which provides greater power savings and control. These switching speeds have improved as illustrated by the shortening in risetime for the following generic VFD types:

| Decade Introduced | Type | Risetime Range |
| --- | --- | --- |
| 1960 | Gate Turn Off (GTO) | (2–4 µs) |
| 1970 | Bipolar Junction Transistors (BJT) | (0.2–2 µs) |
| 1980 | Insulated Gate Bipolar Transistors (IGBT) | (50–400 ns) |

Reflected wave problems occur when a power cable which runs between a drive and an AC motor becomes too long. The cable impedance is formed by the cable's inductance and capacitance and is proportional to the cable length. If the cable impedance does not equal the motor impedance, a reflection of the voltage wave occurs. The motor inductance acts like an open circuit to the high frequency components of the drive waveform. The longer the cable, the greater the amplitude of the reflected wave as the inductance and capacitance of the cable provides more resonance capability. As the length of the cable increases, it starts to act as a transmission line.

The amplitude of the reflected wave is much greater for faster switching speed VFDs, such as IGBTs, as the faster rise time increases reflected wave amplitude. This results in new IGBT type drives requiring much shorter cable lengths to the motor to avoid reflected wave as shown by the following theoretical parts per unit (pu) overvoltage. Per Unit voltage is simply a ratio of voltage to nominal peak voltage. In this case 1.2 PU is 120% of nominal voltage.

| VFD type | VFD Risetime | PU | Required Cable Length |
| --- | --- | --- | --- |
| GTO | 4 us | 1.2 | 300 ft |
| BJT | 1 us | 1.2 | 75 ft |
| IGBT | 100 ns | 1.2 | 10 ft |
| GTO | 4 us | 1.8 | 2000 ft |
| BJT | 1 us | 1.8 | 400 ft |
| IGBT | 100 ns | 1.8 | 40 ft |

The problem with reflected waves is that amplitudes 1.5 to 2.5 times greater than the nominal drive DC bus voltage damage or deteriorate the insulation inside the AC motor. This deterioration shortens the motors life causing unintended replacement, downtime and costs.

While the problem of reflected waves has always existed, the introduction of IGBT type drives has magnified the difficulties as much shorter cable lengths are required. This has hindered the introduction of IGBT drives as many installations are not able to shorten the cable length or have already installed the cable.

The following solutions for reflected waves exist.

Motor Enhancement

Improvements to the insulation within the motor will assist the motor to withstand the potential amplitudes of reflected waves. This solution is being offered by motor manufacturers but obviously increases the cost and size of motors. For installed motors this solution requires their replacement. As a general statement lower voltage motors have greater protection. 240 VAC motors already have a significant amount of insulation, whereas 480 VAC motors generally have a much smaller margin and are much more susceptible to reflected wave problems.

Shorten Cable Length

As the amplitude of the reflected wave is proportional to the cable length, shortening this distance reduces the reflected wave amplitude which protects the motor. This solution is often not practical given the required control versus motor locations, building size and existing cable installation. This is magnified for the newest version of IGBT drives with rise times of 50 ns or less as distances are restricted to 30 feet or less, which is not practical in many industrial facilities.

Output Reactors

Output reactors are sized inductors placed on the cable line at either the motor end or drive end. If placed at the motor end, the reactor isolates the motor from the overvoltage and protects the motor. However, the reactor and motor increase the impedance at the motor end which increases the amplitude of the reflected wave, which may damage the IGBT VFD. Other problems include a significant power loss, voltage drop causing a reduction of motor torque and the requirement to size the reactor for each combination of drive, cable and motor. The power loss is important as the VFD is used to improve energy efficiency.

If placed at the drive end, the reactor increases the cable impedance to match the impedance of the motor. This matching of impedances reduces the reflected wave amplitude. While power loss, voltage drop, motor torque reduction and sizing are still problems, the reactor size is reduced as the reflected wave amplitude is reduced rather then increased when compared to placing the reactor at the motor.

Filters

RLC (resistor, inductor, capacitor) or LC filters with isolated capacitors are used near the motor or VFD to smooth the waveform and remove overvoltage reflected waves. These work well but are expensive, must be sized, create a voltage drop which reduces the motor torque and have a significant power loss especially for high horsepower drives.

Line Terminating Impedance

RC terminating impedance devices consist of resistors and capacitors. They are placed near the motor and draw current in such a manner as to reduce the impedance at the motor. This matches the cable impedance to the motor impedance which decreases the reflected wave. Problems include high power loss and unintended shutdown of the VFD in extended cable length situations as the VFD senses what appears to be a fault current.

Invention

The invention removes reflected waves but in a standard parallel design for all amperage levels for a given VFD system voltage level. This removes the need for sizing the invention for each drive, cable, motor combination. The invention also removes only the destructive portion of the reflected wave which is above the DC bus voltage (ie the nominal peak voltage) of the VFD being utilized. This substantially decreases the amount of power loss compared to other solutions and creates no voltage drop which reduces torque.

OBJECTS OF THE INVENTION

The objects of the invention are to:

improve suppression of reflected wave in VFD - cabling - motors configurations lower power loss lower cost reduce size improve reliability not require sizing due to combinations of current, motor (horsepower), cable length or VFD type not require changes to motor designs.

SUMMARY OF THE INVENTION

The invention is an adaptation of a prior patent application by one of the inventors entitled Improved Transient Voltage Surge Suppression and Electrical Noise Attenuation Circuit (08/538,226) now U.S. Pat. No. 5,646,810, the whole of which is incorporated herein by reference. The invention utilizes the same concept of rectifying AC electrical problems to DC where they are absorbed and then dissipated. However, substantial differences in the circuit, component sizing and application exist between the invention and the previous patent application.

More particularly, in accordance with the present invention there is provided a circuit to protect an AC motor from overvoltages caused by reflected waves, where the AC motor is powered through an electrical power cable by a Variable Frequency Drive having a DC bus voltage. The circuit comprises a capacitor having a positive pole and a negative pole, and first uni-directional diodes connected to at least one line and neutral and/or between lines of the electrical power cable and providing positive voltage to the positive pole of the capacitor. The circuit further comprises second uni-directional diodes connected to the at least one line and neutral and/or between the lines of the electrical power cable and providing negative voltage to the negative pole of the capacitor. A discharge resistor is provided for discharging voltage across the capacitor. Overvoltage sensing means are provided for sensing when voltage across the capacitor exceeds a preset overvoltage level in excess of the DC bus voltage. A discharge resistor switching means in series with the discharge resistor and controlled by the overvoltage sensing means discharges the voltage through the discharge resistor when voltage across the capacitor exceeds the preset level, the discharge resistor switching means and discharge resistor being wired in parallel with the capacitor.

The circuit according to the present invention is attached in parallel near the AC motor of the VFD-cable-motor arrangement to protect the motor from reflected waves.

More particularly, the circuit consists of:

1. Diodes which convert AC to DC power. As the diodes are in a Full Wave Bridge (FWB) circuit, either positive or negative surges will be converted.

2. A capacitor which absorbs the DC electricity converted by the diodes and stores the excess energy. Either DC or AC capacitors can be used. DC capacitors have a much smaller size and have a lower cost compared to comparable AC capacitors, allowing for much greater energy storage. However AC capacitors handle the high frequency charge/discharge cycle better with lower losses and lower ripple voltage. Either type of capacitor, once charged above the invention's trigger level, will discharge the stored energy as positive DC current, which must flow in one direction through the discharge circuit as the diodes are unidirectional.

3. The discharge circuit dissipates the DC power which is stored by the capacitor. No electrical energy is released back to the system.

The discharge circuit consists of a voltage control unit and a resistor. The voltage control unit provides a means of monitoring the capacitor voltage and sensing when it exceeds the VFD DC bus voltage, and then provides a mechanism to discharge the overvoltage when it occurs. This is different from the previous patent application 08/538,226 which required only a resistor to discharge the capacitor to peak AC nominal voltage. The low occurrence rate of AC transients allowed the large resistor the time to discharge the capacitor within a couple of 60 Hz cycles. However, the constant and repetitive nature of reflected waves does not provide the time to discharge the capacitor with a high resistance resistor (typically 100,000 to 500,000 ohms). Nor can the resistance level of the resistor be lowered to such a low level (200 ohms or less) to quickly discharge the capacitor as the current draw from the motor cable would be too great. Instead the discharge circuit requires a low resistance resistor for quick discharge of the capacitor and a voltage control unit associated with the resistor to quickly allow the circuit to switch between a closed condition when required and an open condition when the capacitor is discharged to the appropriate level.

The voltage control unit voltage trigger is set at or above the DC bus voltage of the VFD being utilized. The expression 'DC bus voltage' throughout this specification refers to the peak nominal positive and/or negative voltage of the waveform on the output of the VFD. This value may also be referred to as the VFD DC bus voltage and is equivalent to the nominal peak value of the AC supply voltage from the VFD to the motor. The voltage control unit can consist of a variety of circuit arrangements but all utilize either a zener diode(s) or some other electrical device or circuitry to act as a voltage clamping circuit, thereby acting as the voltage trigger monitor. In its simplest working form a lone zener diode with a trigger voltage equal to or slightly in excess of the DC bus voltage is utilized.

This allows the discharge circuit to close when the capacitor voltage level exceeds the DC bus voltage, quickly discharging the stored energy in the capacitor as heat in the resistor and opening once the DC bus voltage is reached. This is done quickly enough to reduce the reflected wave and only absorb the overvoltage portion.

BRIEF DESCRIPTION OF THE DRAWINGS

These and other advantages of the invention will become apparent upon reading the following detailed description and upon referring to the drawings in which.

DETAILED DESCRIPTION OF THE INVENTION

Figure 1:
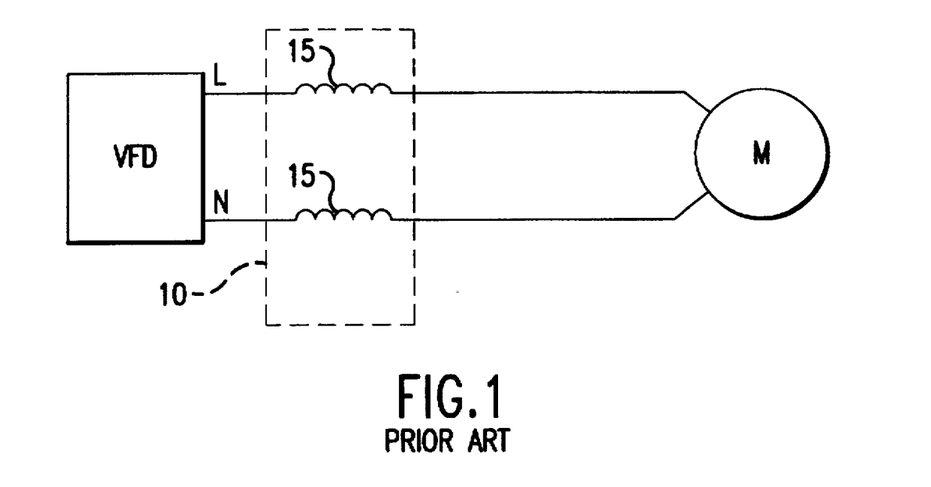
FIG. 1 is a schematic of a typical prior art single phase reactor near the VFD.

FIG. 1 details a conventional single phase output reactor circuit 10 placed near the VFD and used to increase the cable surge impedance to match the surge impedance of the motor. This matching of impedance by inductors 15 on line L and neutral N substantially reduces the reflected wave as well as provides filtering capability.

Disadvantages include power loss and a substantial voltage drop causing a decrease in motor torque. The reactors must also be sized for each VFD, cable, motor arrangement.

Figure 2:
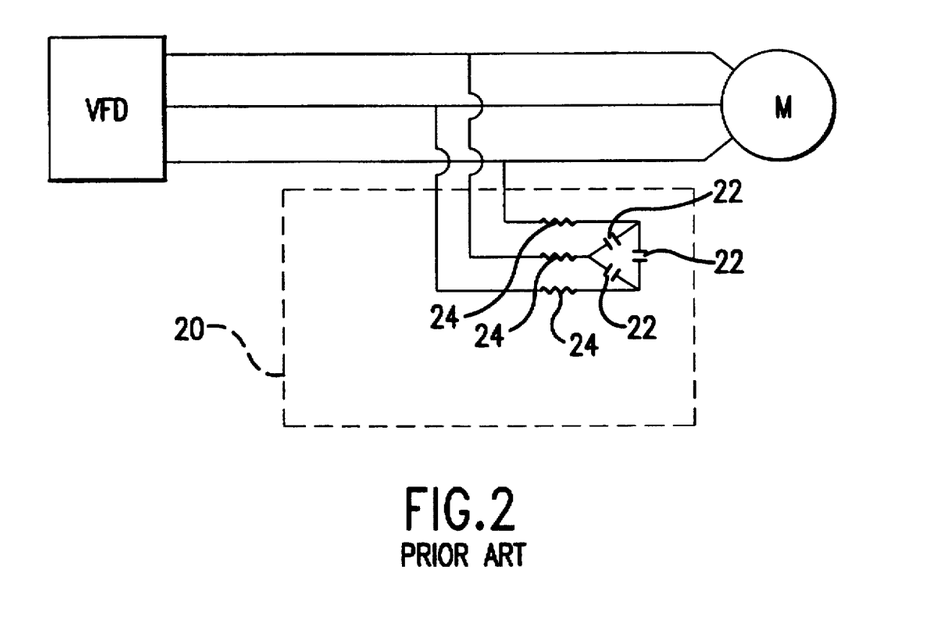
FIG. 2 is a schematic of a typical prior art three phase RC line terminating impedance device.

FIG. 2 details a conventional three phase RC Line Terminating Impedance circuit 20 used to decrease impedance at the termination of the cable at the AC motor. The capacitors 22 absorb energy which lowers the motor's impedance hence reducing reflected waves. Resistors 24 discharge the capacitors on the negative side of each phase's cycle. This provides an improved impedance match between the cable and the motor therefore reducing reflected waves.

The disadvantage of the circuit is high power loss.

Figure 3:
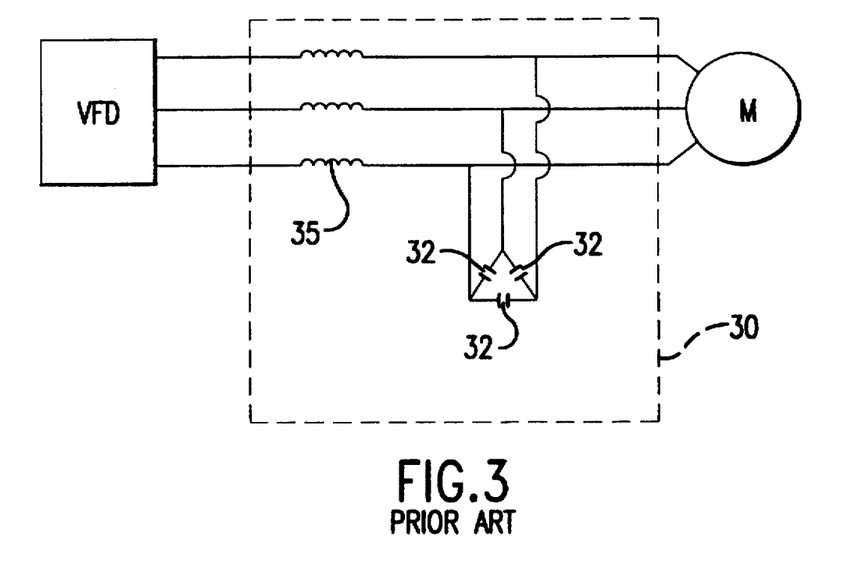
FIG. 3 is a schematic of a typical prior art three phase motor filter circuit.

FIG. 3 details a conventional three phase filter circuit 30 used to smooth the AC power to the motor. The combination of inductors 35 and capacitors 32 on each line absorb excess energy in the form of a magnetic field and capacitor charging respectively. This reduces high frequency components of drive wave form, which are responsible for reflected waves.

Disadvantages include the requirement to size the circuit components to the maximum current of the motor. Power loss is also significant as is voltage drop which lowers the motors torque.

Figure 4:
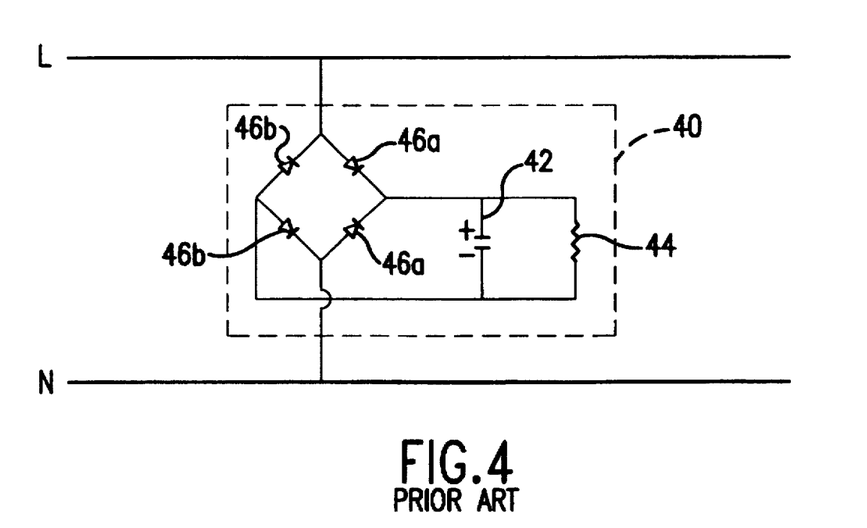
FIG. 4 is a schematic of a previously filed patent application that has certain similarities to the invention.

FIG. 4 is a schematic of a previous patent application Ser. No. 08/538,226 showing a Diode to Energy Storage to Dissipation (DESD) circuit. The DESD is used with other surge suppression components to protect AC electrical systems from power surges and electrical noise. It has never been used on its own or to suppress reflected waves in drive-cable-motor applications.

The schematic shows a simple DESD circuit 40 protecting one mode on line to neutral. A positive surge on the line wire above the peak voltage flows through the diode 46a from the line wire. The diode would convert the surge to DC electricity which is then absorbed by the DC capacitor 42. The DC capacitor then releases the stored energy in a controlled, steady manner as positive DC current. This current must flow through the resistor 44, as the circuit will only allow the DC current to flow in that direction as diodes 46b are unidirectional. The resistor 44 dissipates the energy in a controlled manner. The DC capacitor returns to a charged state of peak system voltage within seconds. The circuit is bi-directional, or able to handle surges in either direction, as a surge on neutral would be converted to DC electricity by diode 46a connected to the neutral line. Diodes 46b complete the circuit.

The DESD circuit does not work for drive-cable-motor applications. Reflected waves instead of being sporadic overvoltages are constant and repetitive although at lower overvoltage levels then typical AC power surges. This constant nature of reflected waves does not allow the resistor 44 the time to deplete the capacitor 42. To accomplish such a depletion the resistor 44 would require such a low resistance that the current draw would be very large with the DC capacitor being by-passed. Power loss would be significant.

Figure 5:
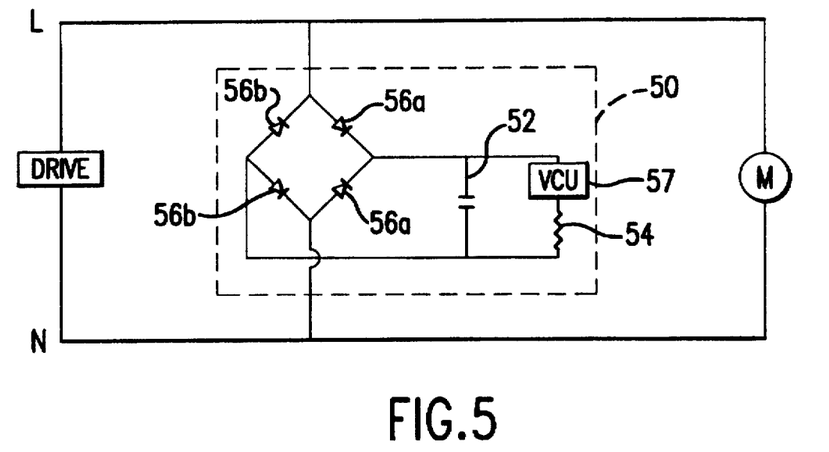
FIG. 5 is a schematic of the invention with the voltage control unit (VCU) circuit not fully detailed.

FIG. 5 is a schematic of the invention or RWT (Reflected Wave Trap) 50 for a one phase VFD and AC motor arrangement.

As shown in the Figure, diodes 56a and diodes 56b form a full wave bridge rectifier which maintains DC voltage across capacitor 52 at a relatively constant level related to the nominal DC bus voltage between line and neutral. When a voltage above the DC bus voltage appears on either the line wire L or the neutral wire N between line and neutral caused by a reflected wave, this reflected wave overvoltage will flow through the diode 56a. The diodes 56a redirect the reflected wave, which has a voltage higher than the DC bus voltage, into the capacitor 52. A voltage control unit 57 senses voltage above a preset overvoltage level across the capacitor (also referred to herein as the "trigger voltage") and completes a circuit across the capacitor through discharge resistor 54 when the voltage exceeds this preset level, which is typically the VFD nominal DC bus voltage. The capacitor 52 is then able to release the stored energy in a rapid manner as DC current through discharge resistor 54 which has a low resistance. This current must flow through the discharge resistor 54 as the circuit will only allow DC current to flow in that direction as diodes 56a are unidirectional. The discharge resistor 54 dissipates the energy in a controlled manner, causing the voltage across capacitor 52 to drop to the DC bus voltage level which in turn causes the VCU to open the path through discharge resistor 54. Once open, further discharge through discharge resistor 54 is no longer possible, and the capacitor returns to a charged state of DC bus voltage within microseconds. The circuit is bi-directional, or able to handle reflected waves in either direction, as a surge on a neutral would be converted to DC electricity by diode 56a connected to the neutral line. Diodes 56b complete the circuit.

The circuit will normally act to return the capacitor to the DC bus voltage before the next reflected wave, at which point the VCU will cease conducting until the next overvoltage condition. However, if a reflected wave occurs before the capacitor returns to the DC bus voltage, the VCU will continue to conduct, discharging voltage through the discharge resistor for as long as the overvoltage condition continues.

The VCU therefore acts as both a voltage sensor or monitor and as a switch. The VCU monitors the voltage across the capacitor, and switches the discharge resistor into the circuit across the capacitor as needed during periods of overvoltage, and for as long as the overvoltage persists. When the overvoltage condition ceases, the VCU senses this and switches the discharge resistor out of the circuit.

Figure 6:
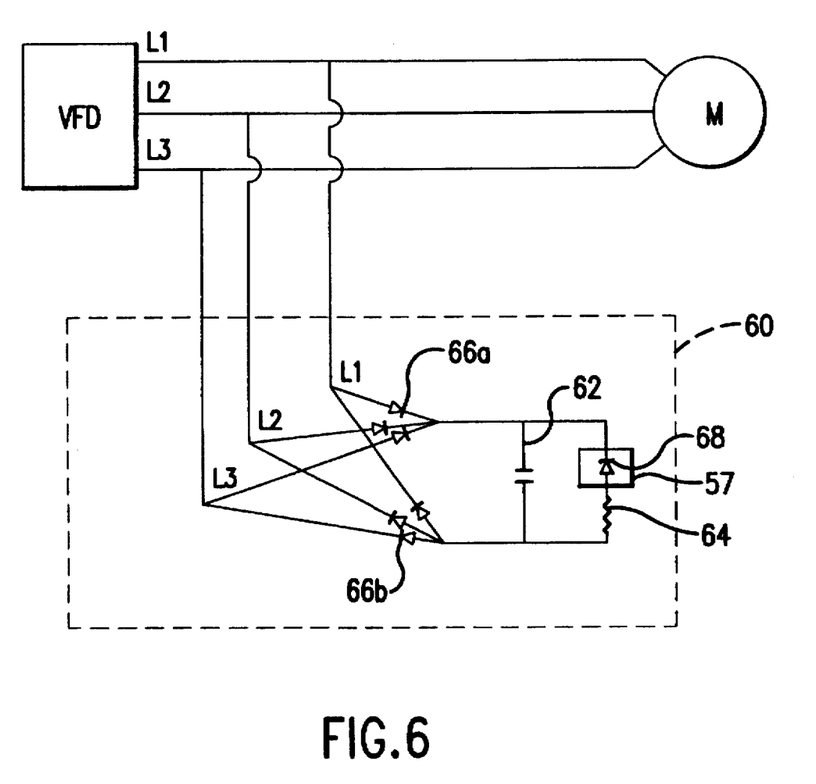
FIG. 6 is a schematic of the invention for a three phase application with the simplest circuit of the VCU detailed.

FIG. 6 is a schematic of the RWT circuit 60 for a three phase motor application. While the capacitor and resistor sizing would change, their basic circuit function would remain the same as in the RWT circuit 50. However, three incoming diodes 66a and three outgoing diodes 66b would be used or one incoming and one outgoing for each line. The capacitor 62 can either be a DC or AC capacitor. An AC capacitor with a value in the range 0.1 microfarads to 2.2 microfarads is recommended. If the capacitor value is below this range, the reflected wave may not be adequately reduced, and if the capacitor value is above this range, the capacitor will not be able to fully discharge before the next drive pulse. An AC capacitor is recommended as it is more efficient (ie lower power losses and lower ripple voltage) than a DC capacitor under similar conditions. The resistor 64 must have a low resistance level (100 ohms or less is recommended) to quickly discharge the capacitor 62. The Voltage Control Unit 57 can be a variety of circuits in line with the resistor. Shown is the simplest version of a single zener diode 68 with a trigger voltage set at the VFD DC bus voltage. The zener diode 68 (sometimes called an avalanche diode) coordinates the entire RWT circuit 60. When the cycle of discharging of the capacitor 62 has been completed the capacitor voltage drops to the DC bus voltage which causes the zener diode 68 to stop conducting which ceases discharge of the capacitor 62. The capacitor is available to absorb voltages above the set voltage. Once it has absorbed such overvoltage, the zener diode 68 conducts allowing the capacitor to be discharged again. In applications utilizing IGBT VFDs this cycle would happen thousands of times per second.

A disadvantage of the use of the zener diode 68 in series with the resistor is that the zener diode has resistance characteristics which cause it to heat up. This unintentional heat is likely to shorten the zener diodes life. This problem is solved in a more advanced VCU explained later.

Figure 7:
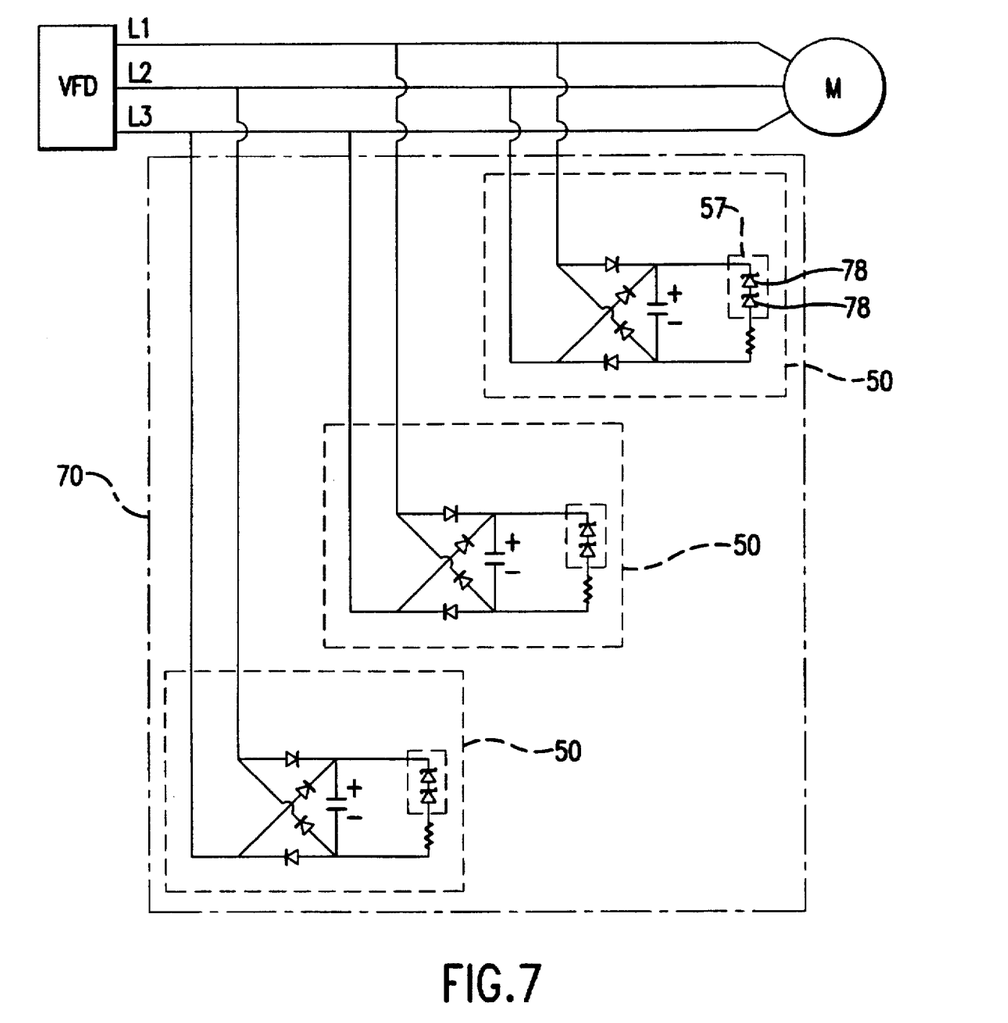
FIG. 7 is a schematic of a variation of the invention for three phase applications.

FIG. 7 outlines another RWT circuit 70 combination for a three phase motor application. Instead of a single RWT circuit 60 protecting all lines, multiple RWT circuits 50 across each combination of lines would achieve the same result. Other combinations would also be possible. One advantage of utilizing such combinations of multiple circuits is that each circuit 50 protects a single line to line mode which increases the time available to discharge the capacitor of each circuit 50 by a factor of three, although the cost would likely be higher. FIG. 7 also demonstrates the VCU 57 consisting of two or more zener diodes 78 in series. Multiple zeners (or other such voltage sensing devices or circuits) may be used in any of the embodiments of the invention in order to achieve a given desired aggregate trigger voltage, which is equal to the sum of the zener or clamping voltages of the individual zener diodes. This allows much greater ability to set the voltage trigger level near the VFD bus voltage with different combinations of zener diodes. Single zener diodes with the correct voltage trigger level are often not available. It is recommended that several 50 or 100 volt zener diodes be used in series for the voltage clamp. The total zener voltage should be 750 V for a 480 V drive system, and 900 V for a 600 V system. Zener diodes of this value are easier to obtain. Several smaller value zener diodes will also evenly distribute the power dissipation in the circuit, whereas a high power zener diode would be required if only one zener diode was used.

Figure 8:
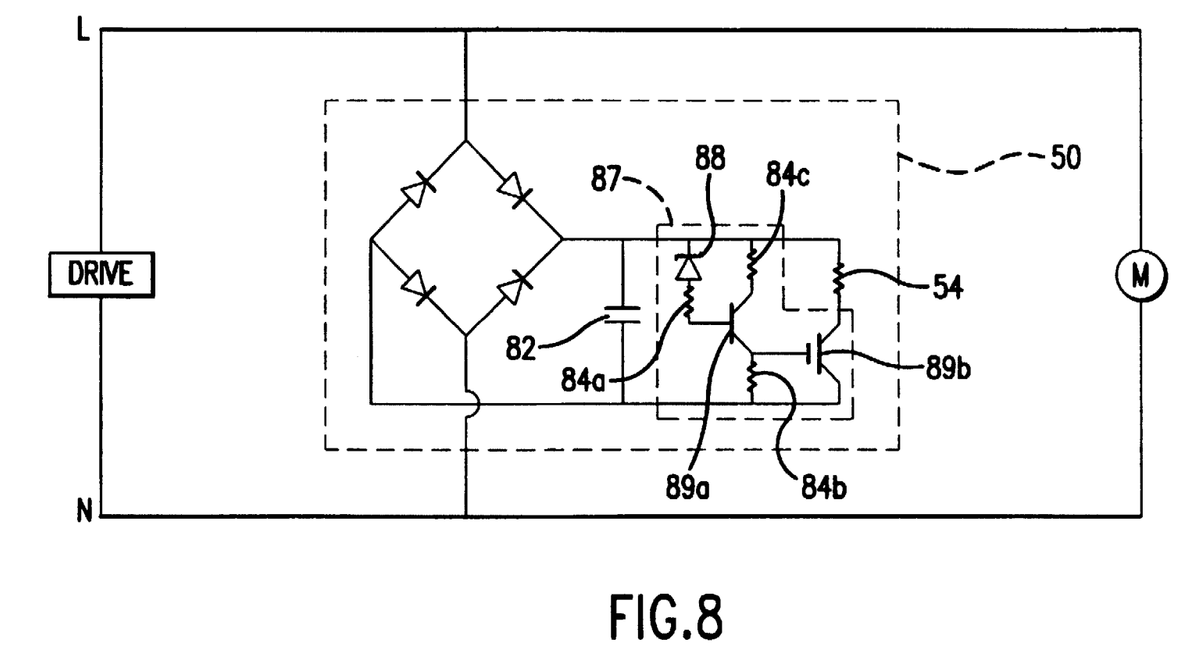
FIG. 8 is a schematic of the invention for single phase applications with a more advanced VCU detailed.

FIG. 8 is a schematic of the invention for a one phase VFD and AC motor arrangement but with a more advanced VCU 87. The circuit is the same as the RWT 50 but the VCU 87 instead utilizes the zener diode 88 to trigger an IGBT 89b to close the circuit through the resistor 54.

The zener diode 88 would be set at or somewhat above the VFD's DC bus voltage. When the voltage across capacitor 82 is above this level, the zener diode 88 would be triggered. The current flow would be controlled by resistor 84a (having a preferred resistance range in the embodiment shown of approximately 5 kilohms to 2 megohms) and would then trigger BJT 89a to conduct. This would create a second higher current electrical flow controlled by resistors 84c and 84b. In the embodiment shown, resistor 84b would have a value in the approximate range 100 ohms to 1 kilohm and resistor 84c would have a value in the approximate range 10 kilohms to 100 kilohms. This electrical flow would trigger IGBT 89b to conduct allowing current to flow through main resistor 54. The two step trigger is used to minimize the current through the zener diode 88 and thus avoid heat problems associated with higher current levels. The heat is subsequently discharged by components designed to withstand such heat such as resistor 54 and IGBT 89b and to a lesser extent resistors 84c and 84b and BJT 89a. BJT 89a and IGBT 89b should be rated to withstand at least 1,000 volts for AC systems of 600 volts or less.

Other circuits can be created for the VCU such as the zener diode 88 triggering the IGBT directly. However, all such circuits utilize either a zener diode (or a number of zener diodes in series), or equivalent electronic circuitry or devices as the voltage trigger in order to sense when the voltage across the capacitor exceeds the preset level.

The above explanations and figures explain the use of the RWT circuit when wired in parallel near the motor in a drive, cable, AC motor arrangement. The circuit can be used for different voltages and does not have to be motor horsepower sized for a given voltage. One of the advantages of the present invention is that it can be made to function with higher voltage VFD systems. Thus, while values are suggested above for 600 volt systems or less, higher voltage systems can be dealt with in a simple fashion simply by selecting component voltage and power ratings appropriately.

The performance of the RWT circuit is impressive compared to prior art. The invention limits maximum voltage with relatively small energy loss. The invention was tested against an existing product sold by a major manufacturer of VFDs. Their design consisted of a RC Snubber circuit. The test details and results are displayed below:

| Test Details | |
|---|---|
| Electrical System | AC 480 VAC 3 phase |
| Drive | 2.5 kHz Carrier |
| Test Speed | 20 Hz |
| Drive Bus Voltage | 680 V |
| Cable length | 100 ft |
| Motor size | 1 HP |
| Suppressor location | Terminals of motor |

| Results | Maximum Voltage | Energy Loss |
|---|---|---|
| No Reflected Wave Suppressor | 1250 V | N/A |
| Line Terminating Impedance Device | 888 V | 80 watts |
| RWT | 784 V | 20 watts |

The test result demonstrates that the invention provides improved reflected wave suppression at substantially lower energy loss. The RWT circuit has the following advantages:

1. Improved suppression of reflected waves

2. Lower energy loss especially in high voltage and/or amperage applications

3. Reduced power losses allow operation at higher VFD frequencies

4. Smaller size

5. Lower operating temperatures

6. Improved reliability because of lower operating temperatures

Thus, it is apparent the there has been provided in accordance with the invention an improved reflected wave suppressor circuit that satisfies many of the objects, aims and advantages set forth above. While the invention has been described in conjunction with example embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A circuit to protect an AC motor from overvoltages caused by reflected waves, the AC motor powered through an electrical power cable by a Variable Frequency Drive having a DC bus voltage, the circuit comprising:

(a) a capacitor having a positive pole and a negative pole;
   (b) first uni-directional diodes connected to at least one line and neutral and/or between lines of the electrical power cable and providing positive voltage to the positive pole of the capacitor;
   (c) second uni-directional diodes connected to said at least one line and neutral and/or between said lines of the electrical power cable and providing negative voltage to the negative pole of the capacitor;
   (d) a discharge resistor for discharging voltage across the capacitor;
   (e) overvoltage sensing means for sensing when voltage across the capacitor exceeds a preset overvoltage level equal to or in excess of the DC bus voltage,
   (f) discharge resistor switching means in series with the discharge resistor and controlled by the overvoltage sensing means for discharging voltage through the discharge resistor when voltage across the capacitor exceeds the preset level, the discharge resistor switching means and discharge resistor being wired in parallel with the capacitor.

2. A circuit according to claim 1, wherein the overvoltage sensing means and the discharge resistor switching means is comprised of at least one zener diode, the at least one zener diode having a trigger voltage approximately equal to the preset overvoltage level.

3. A circuit according to claim 1, wherein the overvoltage sensing means and the discharge resistor switching means is comprised of two or more zener diodes in series, the sum of the clamping voltages of the two or more zener diodes being approximately equal to the preset overvoltage level.

4. A circuit according to claim 1, wherein the AC motor is a three phase AC motor powered by an electrical cable having three separate phased power conductors, and first and second uni-directional diodes are connected to each of the three phased power conductors.

5. A circuit according to claim 1, wherein the overvoltage sensing means comprises one or more zener diodes having an aggregate trigger voltage approximately equal to the preset overvoltage level, and the discharge resistor switching means comprises an Insulated Gate Bipolar Transistor switchable between a conducting state and a non-conducting state and controlled by the one or more zener diodes to conduct most of the current passing through the discharge resistor when the one or more zener diodes is triggered.

6. A circuit according to claim 5, wherein the Insulated Gate Bipolar Transistor is controlled by a bipolar junction transistor controlled by the one or more zener diodes.

\* \* \* \* \*